(12) United States Patent
Merkin (10) Patent No.: US 10,540,072 B2
(45) Date of Patent: Jan. 21, 2020

(54) SYSTEM AND METHOD FOR SELF-OPTIMIZING A USER INTERFACE TO SUPPORT THE EXECUTION OF A BUSINESS PROCESS

(71) Applicant: ABB Schweiz AG, Baden (CH)

(72) Inventor: Aaron Merkin, Round Rock, TX (US)

(73) Assignee: ABB Schweiz AG, Baden (CH)

( * ) Notice: Subject to any disclaimer, the term of this patent is extended or adjusted under 35 U.S.C. 154(b) by 372 days.

(21) Appl. No.: 14/331,270

(22) Filed: Jul. 15, 2014

(65) Prior Publication Data

US 2016/0018972 A1 Jan. 21, 2016

(51) Int. Cl.
 - *G06F 3/048* (2013.01)
 - *G06F 3/0484* (2013.01)
 - *G06Q 10/06* (2012.01)

(52) U.S. Cl.
CPC ...... *G06F 3/04847* (2013.01); *G06F 3/04842* (2013.01); *G06Q 10/0633* (2013.01); *G06Q 10/0639* (2013.01)

(58) Field of Classification Search
CPC .... G06F 11/34; G06F 11/3438; G06F 9/4443; G06F 17/3089; G06F 17/30905
See application file for complete search history.

(56) References Cited

U.S. PATENT DOCUMENTS

| | | | |
|---|---|---|---|
| 7,882,006 B2 * | 2/2011 | Gardner | G06Q 40/06 705/36 R |
| 8,090,462 B2 | 1/2012 | Wininger | |
| 8,233,879 B1 * | 7/2012 | Lee | H04L 41/00 455/405 |
| 8,972,361 B1 * | 3/2015 | Reiner | G06Q 10/06 707/694 |
| 2004/0109030 A1 * | 6/2004 | Farrington | G06F 9/453 715/808 |
| 2005/0147031 A1 * | 7/2005 | Bhatia | H04L 1/0001 370/229 |
| 2005/0147946 A1 * | 7/2005 | Ramamurthy | G06N 5/04 434/118 |
| 2006/0050865 A1 * | 3/2006 | Kortum | G06F 9/453 379/265.07 |
| 2006/0095484 A1 * | 5/2006 | Erramilli | G05B 13/021 708/200 |
| 2009/0070316 A1 * | 3/2009 | Beauchesne | G06F 16/9535 |

(Continued)

OTHER PUBLICATIONS

International Search Report and Written Opinion issued in corresponding international application No. PCT/US2015/040172, dated Sep. 25, 2015, 7 pp.

(Continued)

*Primary Examiner* — Hua Lu
(74) *Attorney, Agent, or Firm* — Taft Stettinius & Hollister LLP; J. Bruce Schelkopf (57) ABSTRACT

A system, method, and computer program product for optimizing a graphical user interface in support of a business process are provided. User activity in a first version of the graphical user interface is logged and compared against a first GUI definition to generate variance data. The variance data is compared to a user proficiency rating generated from personnel and/or reputational data for the user(s) to determine whether and the manner in which to implement the variance data in a second version of the GUI.

15 Claims, 3 Drawing Sheets

(56) References Cited

U.S. PATENT DOCUMENTS

| | | | |
|---|---|---|---|
| 2011/0093420 A1* | 4/2011 | Rothenberg | G06Q 10/06 |
| | | | 706/45 |
| 2011/0154216 A1* | 6/2011 | Aritsuka | G06F 9/451 |
| | | | 715/745 |
| 2011/0214067 A1 | 9/2011 | Tanaka | |
| 2012/0159345 A1* | 6/2012 | Gonsalves | G06F 3/0482 |
| | | | 715/745 |
| 2013/0007009 A1* | 1/2013 | Caldwell | G06F 16/337 |
| | | | 707/748 |
| 2014/0068735 A1* | 3/2014 | Marinov | G06F 21/31 |
| | | | 726/7 |
| 2014/0330734 A1* | 11/2014 | Sung | G06Q 10/1053 |
| | | | 705/321 |
| 2014/0358606 A1* | 12/2014 | Hull | G06Q 10/063112 |
| | | | 705/7.14 |
| 2015/0229698 A1* | 8/2015 | Swan | G06Q 10/101 |
| | | | 709/203 |

OTHER PUBLICATIONS

Nielsen, "Iterative User-Interface Design", Computer, IEEE, vol. 26, No. 11, Nov. 1, 1993, pp. 32-41.

* cited by examiner

SYSTEM AND METHOD FOR SELF-OPTIMIZING A USER INTERFACE TO SUPPORT THE EXECUTION OF A BUSINESS PROCESS

FIELD OF INVENTION

The present disclosure is directed to systems, methods and software for optimizing a graphical user interface representative of a business process in a computer system.

BACKGROUND

Application designers create user interfaces to support the execution of business processes in a business system. In response to user, supervisor, or customer feedback, the application designer updates the user interface to improve the usability of the application. The application is then redeployed to the end users' devices. The life cycle of the application continues along this path without considering the actual interaction of the users with the user interface supporting the execution of the business process.

SUMMARY

An object of the present disclosure is to provide a computer-implemented method for optimizing the execution of a business process driven by end user interaction with a user interface for executing the business process, the method having the following steps:
  recording user input in a timestamp activity log during execution of the business process by a user in a first version of the user interface;
  transforming the recorded user input in the timestamp activity log into metrics representative of the user's interaction with the first user interface version;
  generating variance data by comparing the user interaction metrics with a workflow definition of the first user interface version;
  generating a user proficiency rating using data representative of the user's reputation and experience level;
  comparing the user proficiency rating with the variance data using an analytics tool; and
  creating a second version of the user interface based on the variance data and the user proficiency rating.

Another object of the present disclosure is to provide a non-transitory computer readable medium having computer readable instructions stored thereon for execution by a processor to perform a method for GUI optimization, the method having the following steps:
  generating a timestamp activity log during execution of a business process by users of a first version of a GUI;
  generating metrics from the timestamp activity log representing analysis of the business process execution by the users;
  accessing at least one data source having reputation/experience information for the users;
  generating a user proficiency rating from the at least one data source;
  comparing the metrics with the user proficiency rating; and
  generating a second version of the GUI based on the comparison between the metrics and the user proficiency rating, the second GUI version representative of user interaction with the first GUI version.

BRIEF DESCRIPTION OF THE DRAWINGS

In the accompanying drawings, structural embodiments are illustrated that, together with the detailed description provided below, describe exemplary embodiments of a self-optimizing user interface to support the execution of a business process. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

There exists a class of applications that are business process-oriented. The graphical user interfaces (GUIs) employed in business process-oriented applications are designed to support the execution of business processes by an end user. The GUI may or may not accurately reflect the business process definition. For instance, the granularity of the workflow within the GUI may be more fine-grained than the business process definition. Alternatively, the business process may define a step wherein three pieces of information A, B, and C need to be collected without specifying the order in with the information is actually input by the user.

The GUI may further define a workflow for the collection of this information, for example, in the sequence of B, C, and A. However, as users of the application perform transactions in a business system, the users may discover that it is more efficient to collect the information in the order C, B, A. There is now a mismatch between the efficient task execution and the present GUI definition as defined in configuration versioning 421.

Figure 1:
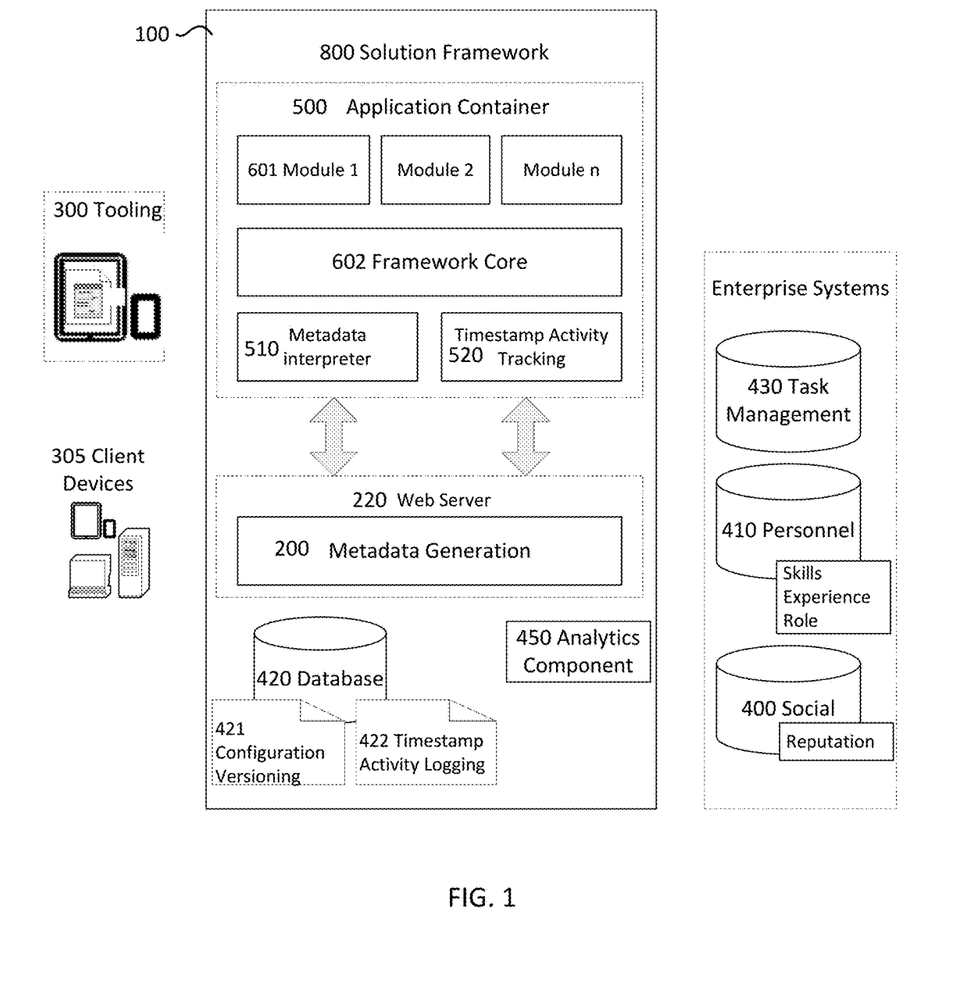
FIG. 1 depicts a system for self-optimizing a user interface.

With reference to FIG. 1, a system 100 for self-optimizing a user interface workflow to support the execution of a business process is depicted. By way of non-limiting example, a business process that is contemplated to benefit from a self-optimized user interface is the establishment of a residential telecommunications service. The establishment of a residential telecommunications service has steps that include but are not limited to: verifying service at a location, verifying service to a target location within a building, installing equipment, and setting up billing. The steps are defined in the GUI to be performed in a particular sequence. It should be understood that any business process capable of execution in any type of computer system is contemplated by the present disclosure.

The system 100 has a solution framework 800, a web server 220, and an analytics component 450. The solution framework 800 is an application development platform that provides services for constructing and implementing web applications, web services and other applications. The solution framework 800 provides an application container 500 for modules 601 through which the users execute business processes.

The modules 601 have a graphical user interface (GUI) that is managed by a framework core 602. The framework core 602 transfers the core of the user interface. A metadata interpreter 510 and timestamp activity tracking component 520 reside in the application container 500. The web server 220 supports metadata generation 200 and serving up the metadata to interpret the workflow on a browser side for delivery to the client device 305. Client devices 305 access the modules 601 through the browser or over a network connection to the business system.

In one embodiment, user interaction with the user interface is captured by the activity tracking component 520 and transferred to the server tier synchronously with the execution of the task by the user on the device 35. The user activity tracking information is stored in a database 420 with correlation to the executed tasks as defined in a task management database 430. The database 420 may be a business system database such as a relational database in an ERP system or any other type of database in a business system. In yet another embodiment, the tracking data is transferred asynchronously for purposes such as supporting the disconnected operation of the client device 305. The task results and data associated with the tasks are transferred to the task management database 430 for storage and reporting.

The analytics component 450 accesses and aggregates the tracking data derived from the activity tracking component 520 which is representative of user interactions with the modules 601. The analytics component 450 compares the actual user activity in the GUI against the workflow defined in the GUI. This comparison creates variance data 900 between the defined process and the user's actual execution of the business process. The analytics component 450 also utilizes reputational and experience data from personnel systems and social media to build a user proficiency rating for the users. The user proficiency rating 700 is compared to the variance data 900 to determine whether to generate a second GUI version different from the first GUI version and replace the first GUI version with the second GUI version.

With continued reference to FIG. 1, an application developer defines a first version of the GUI using tooling 300. The tooling 300 provides for business process definition using flow charts and other business process mapping tools. The tooling 300 has underlying metadata that define screen sequences, dependencies and field validations for carrying out the business process in the system. An example of software tooling 300 is the Process Editor available from Signavio Inc. of Sunnyvale, Calif., although it should be understood that other tooling 300 may be used. Alternatively, the first GUI version is used as delivered in the particular business system.

The first version of the GUI, version 1.0, in support of a particular business process is deployed with a workflow that matches a targeted business process as defined by management, a customer, or a super user. The application configuration is deployed to client devices 305 of end users responsible for executing the business process.

In one embodiment, the deployment of the first version of the GUI is carried out by recreating binary code that is deployed to client devices 305 using a customer configuration management system or mobile device management system. In another embodiment, the application configuration is distributed by the solution framework 800 using a binary that is resident on the client device 305. In that same embodiment, the GUI is compiled into a native application built for the client device 305 and operating system of the client device 305.

In yet another embodiment, the client application code is not modified when the application configuration is distributed. In that same embodiment, the configuration is pushed to a web server 220 where it is rendered on clients using the browser installed in the particular client device 305. In that same embodiment, the GUI is defined by a metadata language and interpreted by a renderer. The metadata definition of the GUI is transferred to the client using the solution framework 800, the customer configuration management system, the customer mobile device management system, or any other suitable mechanism.

The client device 305 is a workstation, mobile device, pc, server, laptop, tablet, personal data assistant (PDA) or any other type of device having a processor for executing computer-readable program code to carry out instructions for the execution of a business process, track the activity during user execution of the business process, store data obtained during the user activity tracking, analyze the collected data, and implement a version of the user interface that is different from the current version.

The tasks performed by the user while executing the business process are managed by a task management system 430 such as a workforce management system. An example of a task management system 430 is the Service Suite software available from the assignee of the present application. Alternatively, the task management system 430 may be an ERP system, SaaS (software as a service) or another type of business system. The allocation of tasks may be determined by a user's assigned security profiles and roles.

The task management system 430 has historical performance data such as the time budgeted for completing a task. For example, if the budgeted time is 30 minutes for the completion of a task and the user's actual time to complete the task is 15 minutes, that user is presumed to be an expert. Likewise, a user performing a task in less time than the historical average of all users or a predetermined subset of users may be classified as an expert. However, a user that persists in a screen or transaction representing a business process for a time period that is greater the average duration as measured by all users performing the same task(s) or a subset of predetermined users performing the same task(s) may be deemed by the analytics component 450 to be an inexperienced user. Depending on certain criteria to be further explained below, the expert user may be further classified as a "trusted" user.

Figure 2:
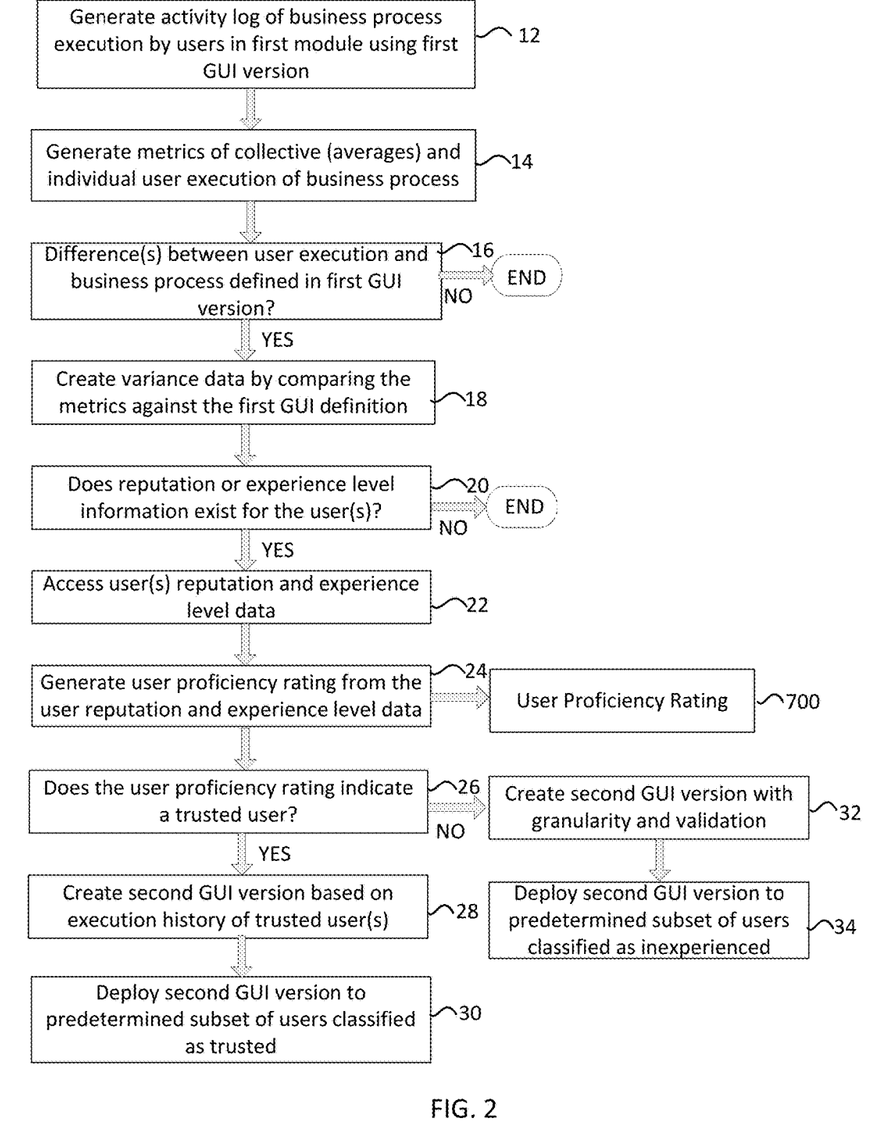
FIG. 2 is a flow chart of a method for self-optimizing a user interface in a business system.

With reference now to FIG. 2, a flow chart depicts a method for self-optimizing a user interface workflow for a business process. A computer program product has a computer readable medium having computer readable instructions stored thereon for execution by a processor to perform the method for GUI self-optimization.

Figure 3:
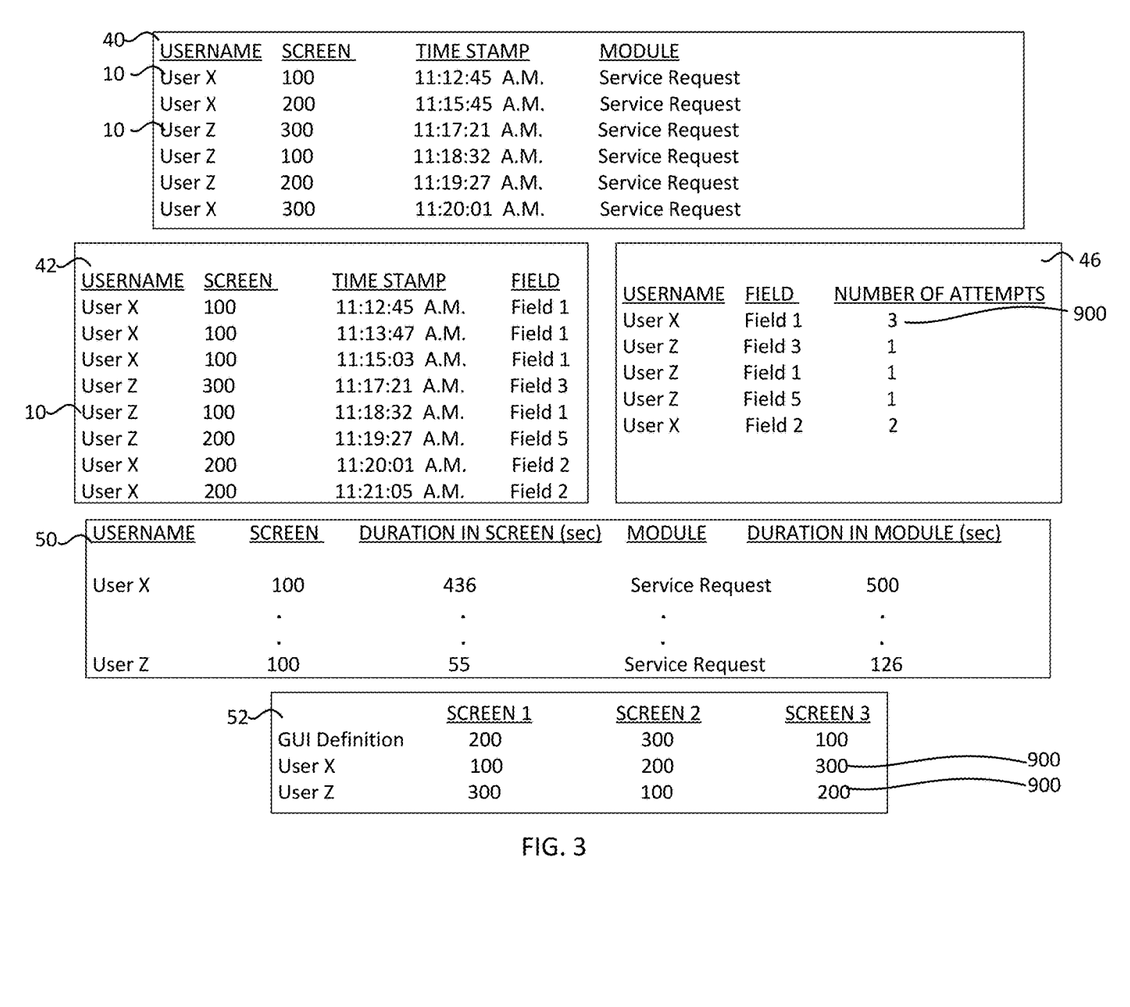
FIG. 3 is an example of raw and aggregated data used in combination with a user proficiency rating to optimize the user interface.

As a user navigates through a first version of the user interface for the particular business process, in the context of the user's assigned tasks, an activity tracking component 520 captures a log of the user's activity as shown in step 12 of FIG. 2. With reference additionally to FIG. 3, the records 10 of user activity 40, 42 are stored in the timestamp activity log 422 as raw data and aggregated by the task management system 430 to generate metrics in step 14. Example metrics are depicted in metrics tables 46, 50, 52. The metrics table 50 stores the total duration in each screen and corresponding module 601 by each user. The metrics table 52 stores the screen sequence of the user during navigation through the GUI.

It should be understood that the database entries and aggregated data-derived metrics tables 46, 50, 52 depicted in FIG. 2 provide one example of carrying out the present disclosure and that other methods are contemplated by the inventor. By way of non-limiting example, a particular screen sequence, order of fields, duration of user interaction within a session, duration of user interaction within a screen, and duration of user interaction during population of various fields are parameters that are captured as users interact with the first GUI version.

Further, user interface traversal follows conventions for written word based on the localization to support the end user. i.e. the user interface is designed for top to bottom traversal, but sometimes goes left to right or right to left. Therefore, information displayed and input field location may be varied in a GUI and the order in which the data is processed relative to other tasks may be varied as between the first and second GUI versions when user input in the first GUI version is analyzed.

The tracking information and data analysis of the analytics component is communicated to the metadata generation component 200 on the web server.

With continued reference to FIG. 3, a successful execution of the business process results in at least one entry 10 in a database 430 with a timestamp and user identification. The successful execution of the business processes may result in multiple records 10 for a business process and/or transaction depending on the structure of the database, an example of which is depicted in FIG. 3.

Additionally, the activity tracking component 520 captures activity that does not result in an entry 10 in the task management system 430 database. Navigation steps carried out by the user through the GUI and unsuccessful attempts at entering values into fields are stored in database 420. Unsuccessful attempts at entering data into the business system include but are not limited to field entries that do not pass validation by the business system. For example, each erroneous field entry made by a user may be tracked and aggregated into a number of unsuccessful attempts by field or by module as shown in metrics table 52 stored in database 420 as timestamp activity log entries 422.

Another metric determined from the data collected by the activity tracking component 520 is the information the user accesses the most frequently. For example, a user may access a dropdown list or search for a value to enter into a field on a frequent basis. The activity tracking component 520 captures this data for storage in the database 420. The frequently accessed information may automatically be presented to the user in the second version of the GUI that is created based on the particular user's activity patterns. For example, the information that may be varied in the second GUI version is a drop down list containing an alphabetical list except for a frequently entered value positioned at the top of the list. By way of non-limiting example, if it is determined by analyzing the first GUI version that the user, IP address of the user, or that most transactions originate in the US, the US country value is placed at the top of the drop down list for user selection in the second version of the GUI.

Continuing with the residential telecommunication installation example, a technician may often search for the code associated with performing particular types of labor such as running wire through an attic. Based on the frequency of this search occurring, the user second version of the user interface is reconfigured to include popular activity codes in the flyover text provided for the input field. One having ordinary skill in the art will understand that flyover text is a prompt for entry of information into an input field based upon suggested input, historical input or another type of predefined user input.

There may be a hierarchy defined in the database of the business system wherein top-level and lower-level data is stored. In the example activity log 40 for users X and Z shown in FIG. 3, the screen and timestamp for each user at a top-level, such as in the service request module, is recorded. At a lower-level or more detailed level in the database hierarchy, the activity log 42 captures the timestamp of each screen and field entry by users X and Z.

With reference now to FIG. 2, at step 16, user activity captured by the activity tracking component 520 and stored in database 420 along with task management system 430 data during the execution of the first GUI version is compared to the definition of the first GUI version by the analytics component 450. If there are no differences between the first GUI workflow configuration versioning 421 and the user activity in the first GUI version, then the process is terminated.

If differences are found between the GUI workflow definition and user execution of the business process through the GUI, variance data 900 is created at step 18. Although the time spent by a particular user carrying out a business process as compared to the average user duration in the business process may be helpful in determining a user's experience level, data such as screen sequence and order of field entry are not dispositive of the experience level of the user that generated the variance data 900. Furthermore, the recorded activity for the particular user may be an anomaly or in the case of a user executing a task over a longer duration than the historical average, a result of a system performance issues. Therefore, the analytics component 450 is used to determine whether an experienced user should be further classified as "trusted" for the input of the particular user in the GUI.

The analytics component 450 determines whether reputation and/or experience level data exists for the user at step 20. If there is no reputation and/or experience level data for the user, the process ends. If reputation and/or experience level data is found, the data is accessed via at least one data source, such as at least one personnel management system 410 or social media application 400 at step 22.

A user proficiency rating is determined at step 24 from the at least one data source. The analytics component 450 then compares the user proficiency rating 700 against metrics determined for that particular user, all users, or a subset of users corresponding to the execution of a business process. Examples of the at least one data source include at least one personnel management system 410, social media applications 400, and other websites and applications having a rating assigned to the user.

An example of the at least one personnel management system 410 used in determining the user proficiency rating 700 is an HR system or any system that stores data relating to the experience level of individual users. The user's level of experience may be determined by job title (customer service rep level I versus customer service rep level II), seniority (such as junior versus senior), number of years of service, amount of time spent in a particular job function relating to the business process or various combinations of the aforementioned indicators of a user's experience level. Skill sets assigned to titles or job functions in the personnel management system 410 may also be utilized in the generation of the user proficiency rating 700.

Additionally, the analytics component 450 accesses the at least one personnel management system 410 for performance review ratings and peer reviews in the determination of the user's proficiency rating 700. The at least one personnel management system 410 may include an HR system, a payroll system, or any other system that manages data related to the experience and skills relating to the users of the particular system. It should be understood that an organization may have more than one HR system for storing data characterizing users employed by the organization and such HR systems are part of the at least one personnel management system 410.

The analytics component 450 may also access ratings stored in social media databases 400 or collaboration systems to determine whether the user is a trusted user. Social media applications 400 log reputation data for individual users as ratings based on whether the user's answers to questions are useful generally or useful as compared to other users of the social media or collaboration system 400. Examples of data sources that are accessed in the determination of the user proficiency 700 are an enterprise collaboration application such as Yammer, a registered service mark of Yammer Inc., a social media application such as LinkedIn, a registered service mark of LinkedIn Ltd., and various websites such as ask.com that serve as forums for various areas of expertise. It should be understood that the sources of information mentioned herein for determining user proficiency 700 ratings are provided by way of non-limiting example and that other sources of information for determining user proficiency ratings 700 may be accessed by the analytics component 450.

The at least one data source is accessed for user information by user name, employee ID, and other identifying data. In one embodiment, if the at least one data source requires disparate identifying information for users of the business system, an identity management solution is utilized to manage the mapping of the respective employee identification data to the identity definitions required by each source system or business system.

Each of the at least one data source having user reputation and/or experience level data is checked and ranked if more than one source has relevant information. Each of the designated parameters goes into a determination of a user's proficiency rating representing a user's competence. In one embodiment, the algorithm utilizes a weighted of average of the scores from the available systems. In yet another embodiment, an administrator adjusts the weight of the scores from the at least one data source to reflect an individual customer's view of the relative significance of the different ones of the at least one data source.

By way of non-limiting example, a user is assigned a "helpful" rating on a social media 400 website and the analytics component 450 enters a score of 5, representing the highest score for a user in the particular area of expertise. However, a customer's experience with that user may be less favorable, as a result of input, such as a survey. In that instance, an administrator may assign a lower score than 5 to the user or disregard the score completely and use scores obtained from one or a combination of the personnel management system 410 and the collaboration site.

At step 26, if the user proficiency rating is greater than or equal to a threshold value or falls within a range of values predefined in the analytics component 450, then the user is classified as a trusted user. In one embodiment, multiple users each have user proficiency ratings 700 and variance data 900 as determined by the analytics component 450. The user proficiency ratings 700 that are greater than or equal to a predetermined threshold for the particular area of expertise permits the identified users to be grouped by the analytics component 450.

In one embodiment, the variance data for the user with the highest proficiency rating is utilized and that user's variance data 900 is applied to the generation of the second version of the GUI. In an alternative embodiment, variance data that is common across a group of users determined to be "trusted" users is utilized and uncommon variance data is discarded. It will be obvious to one skilled in the art that a variety of statistical analysis techniques may be applied to derive which variance data to utilize.

The analytics component 450 compares the user proficiency rating 700 with the variance data 900 to determine the changes to be made to the first implementation of the GUI characterizing a business process. For example, if there are differences between the workflow defined in the first GUI version and the workflow executed by the trusted users, a second version of the user interface matching the execution of the users deemed as trusted users is created at step 28. The second version of the user interface, in this example GUI version 1.1, is rolled out to the users deemed to be trusted users in step 30. The trusted users may be identified by user name upon logging into the business system, receiving the GUI version 1.1 on client devices 305. Alternatively, the trusted users may be identified by internet protocol (IP) address or another parameter as defined in the business system.

Conversely, for a subset of users that are not classified as "trusted" based on proficiency rating 700 and the variance data 900 generated from the activity tracking data, additional validation such as specific screen and field sequences are added in the creation of a second version of the user interface at step 32. Therefore, when a user classified as an inexperienced user logs onto the system, the user is identified by username and receives a second version of the GUI, having a rigid workflow definition with additional validation. The second version of the GUI, version 1.2, is deployed to the subset of users determined to be inexperienced at step 34.

The second version of the GUI, including additional validation steps for the inexperienced user(s) or mirroring the activity of the trusted user(s), may be automatically pushed to the devices 305. In an alternate embodiment, the changes are published for review by an administrator and the administrator has the option of modifying the proposed changes before distributing them to the devices 305 or the web server for access by the client devices 305 through browsers or web portals.

In one embodiment, the method of GUI deployment, evaluation, and redefinition generates a second GUI version using a first GUI version as a basis, and is applied iteratively for the same business process until the percentage improvement in efficiency is within a customer-determined threshold. For example, a customer may indicate in a survey or another form of communication with a service organization that a one-hour time period for the installation of a residential telecommunications service is acceptable. The GUI supporting the business process for residential telecommunications installation is continuously revised until the organization estimates that a typical user and/or technician can execute the business process and the service in a time frame that is one hour or less.

In that same embodiment, the labor duration for the technician that installs the residential communications is considered along with the GUI interaction/data entry time to achieve a total service duration of one hour or less. It should be understood that that the above is provided by way of non-limiting example and that other business processes and metrics are contemplated without departing from the scope of the present disclosure.

It should be appreciated that the solution framework 800 may be embodied as a computer program product on a non-transitory computer readable medium, capable of performing the method steps previously mentioned when executed by a processor. Alternatively, the solution framework 800 may be accessed or downloaded over the internet. The computer program product may be provided as a component of an ERP system, SaaS, or any other type of business system.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A computer-implemented method for optimizing the execution of a business process driven by end user interaction with a user interface for executing the business process, comprising:
    recording user input in a timestamp activity log during execution of the business process by a user in a first version of the user interface;
    transforming the recorded user input in the timestamp activity log into metrics representative of the user's interaction with the first user interface version;
    comparing the recorded user input and metrics to a definition of the first version of the user interface;
    generating, if the comparison indicates differences between the recorded user input and metrics and the definition of the first version of the user interface, variance data by comparing the user interaction metrics with a workflow definition of the first user interface version;
    generating, if the comparison indicates differences between the recorded user input and metrics and the definition of the first version of the user interface, a user proficiency rating determined from a plurality of external data sources that provide data representative of the user's reputation and experience level, wherein the plurality of external data sources includes one or more of a personnel management system, a social media application, and a collaboration system that stores user ratings, and wherein a value from the data of at least one of the plurality of external data sources used in generating the user proficiency rating is scaled using a weighted value, the weighted value being different for data from at least two of the plurality of external data sources;
    comparing the user proficiency rating with a predetermined threshold using an analytics tool to determine if the user qualifies as a trusted user; and
    creating, if the user qualifies as the trusted user, a second version of the user interface based on the variance data and the user proficiency rating, wherein the second user interface version indicates a second workflow definition.

2. The method of claim 1 wherein the qualified trusted user is identified by one of a user name, an internet protocol (IP) address, or another parameter defined in the business process.

3. The method of claim 1 wherein when the user proficiency rating is greater than or equal to the predetermined threshold and the user qualifies as the trusted user, the second version of the user interface is created to match the entries in the timestamp activity log for the process executed by the user, wherein the method is applied iteratively until an increase in an efficiency of executing the business process is attained that falls below a defined efficiency threshold.

4. The method of claim 1 wherein when the proficiency rating of the user executing the business process is less than a predetermined threshold as determined by the analytics tool, a third version of the user interface is created with additional validation steps.

5. The method of claim 1 wherein the user proficiency rating and variance data from multiple users are evaluated as the basis for creating the second version of the user interface.

6. The method of claim 1 wherein the user interface is defined by a metadata language and interpreted by a renderer.

7. The method of claim 1 wherein the user interface is compiled into a native application.

8. The method of claim 1 wherein the arrangement of information on the screen is varied.

9. The method of claim 1 where the information provided on a screen is varied.

10. The method of claim 1 where the default values for input fields is varied.

11. The method of claim 1 wherein the order in which fields are navigated is varied.

12. A non-transitory computer readable medium having computer readable instructions stored thereon for execution by a processor to perform a method for GUI optimization, the method comprising:
    generating a timestamp activity log during execution of a business process by users of a first version of a GUI;
    generating metrics from the timestamp activity log representing analysis of the business process execution by the users;
    comparing the generated metrics to a definition of the first version of the GUI;
    accessing a plurality of external data sources having reputation/experience information for the users, wherein the plurality of external data sources includes one or more of a personnel management system, a social media application, and a collaboration system that store user ratings;
    scaling a value of each of the plurality of external data sources based at least on one of a relevancy of the information from the external data source and a rating from the external data source;
    generating, if the comparison indicates differences between the generated metrics and the definition of the first version of the GUI, a user proficiency rating using at least the scaled value from each of the plurality of external data sources;
    comparing the user proficiency rating with a predetermined threshold to determine if the user qualifies as a trusted user; and
    generating, if the user qualifies as the trusted user, a second version of the GUI as an updated business process based on the comparison between the metrics and the user proficiency rating, the second GUI version representative of user interaction with the first GUI version.

13. The non-transitory computer readable medium of claim 12, having further computer readable instructions stored thereon for execution by a processor to perform creating a third version of the GUI having additional validation steps based upon the user interaction with the first GUI version.

14. The method of claim 13, wherein the method is applied iteratively until an increase in an efficiency of executing the business process is attained that falls below a defined efficiency threshold.

15. The non-transitory computer readable medium of claim 12 wherein the qualified trusted user is identified by one of a user name, an internet protocol (IP) address, or another parameter defined in the business process.

* * * * *